United States Patent
Ness et al.

(10) Patent No.: US 11,359,351 B2
(45) Date of Patent: Jun. 14, 2022

(54) EXCAVATOR BOOM MOUNTABLE HIGH PRESSURE HYDRAULIC TOOL INCLUDING A HYDRAULIC MOTOR DRIVEN GENERATOR

(71) Applicant: STANLEY BLACK & DECKER, INC., New Britain, CT (US)

(72) Inventors: Reuben D. Ness, Mulino, OR (US); Aaron Justin Brown, Lake Osweo, OR (US); Joseph Foss Baker, Portland, OR (US)

(73) Assignee: Stanley Black & Decker, Inc., New Britain, CT (US)

( * ) Notice: Subject to any disclaimer, the term of this patent is extended or adjusted under 35 U.S.C. 154(b) by 240 days.

(21) Appl. No.: 16/478,829

(22) PCT Filed: Jul. 1, 2019

(86) PCT No.: PCT/US2019/040173
§ 371 (c)(1),
(2) Date: Jul. 17, 2019

(87) PCT Pub. No.: WO2020/010013
PCT Pub. Date: Jan. 9, 2020

(65) Prior Publication Data
US 2020/0347576 A1    Nov. 5, 2020

Related U.S. Application Data

(60) Provisional application No. 62/692,920, filed on Jul. 2, 2018.

(51) Int. Cl.
*E02F 9/22* (2006.01)
*B66C 1/06* (2006.01)

(52) U.S. Cl.
CPC .............. *E02F 9/2267* (2013.01); *B66C 1/06* (2013.01); *E02F 9/2235* (2013.01); *B60Y 2200/412* (2013.01)

(58) Field of Classification Search
CPC .......... B66C 13/14; B66C 1/06; E02F 9/2235; E02F 9/2267; B60Y 2200/412
See application file for complete search history.

(56) References Cited

U.S. PATENT DOCUMENTS 3,903,973 A * 9/1975 Leyrat .................. E21B 3/02
173/218
6,510,902 B1 * 1/2003 Prokop ................. E02F 3/966
173/1

(Continued)

FOREIGN PATENT DOCUMENTS

GB        2185730 A      7/1987

OTHER PUBLICATIONS

International Search Report and Written Opinion dated Sep. 27, 2019 in corresponding PCT Application No. PCT/US2019/040173.

*Primary Examiner* — Abiy Teka
(74) *Attorney, Agent, or Firm* — Harness, Dickey & Pierce, P.L.C.

(57) ABSTRACT

An output shaft of a hydraulic motor is enclosed within a sealed housing and coupled to an input shaft of an electric generator using non-contact couplings. Tool electrical components are electrically coupled to the electric generator. A high pressure hydraulic tool circuit includes a hydraulic tool load and the hydraulic motor of the electric power generation assembly coupleable between a hydraulic boom inlet line and a hydraulic boom return line. Both the hydraulic tool load and the hydraulic motor of the electric power generation assembly can be designed to input hydraulic fluid up to the full rated pressure of the tool. The sealed housing of the hydraulic motor of the electric power generation (Continued)

assembly can be designed to retain hydraulic fluid within the interior up to the full rated pressure of the tool so that no case drain or separate low pressure return line for the hydraulic motor is necessary.

23 Claims, 4 Drawing Sheets

(56) References Cited

U.S. PATENT DOCUMENTS

| | | | |
|---|---|---|---|
| 2012/0089279 A1* | 4/2012 | Onsager | B60L 50/13 701/22 |
| 2012/0130576 A1* | 5/2012 | Sugiyama | B60L 15/00 903/903 |
| 2018/0010318 A1* | 1/2018 | Friedrich | E02F 3/3627 |

* cited by examiner

EXCAVATOR BOOM MOUNTABLE HIGH PRESSURE HYDRAULIC TOOL INCLUDING A HYDRAULIC MOTOR DRIVEN GENERATOR

CROSS-REFERENCE TO RELATED APPLICATIONS

This application is a National Stage of International Application No. PCT/US2019/040173, filed Jul. 1, 2019, which application claims the benefit of U.S. Provisional Application No. 62/692,920, filed on Jul. 2, 2018. The entire disclosures of the above applications are incorporated herein by reference.

FIELD

The present disclosure relates to high pressure hydraulic attachment tools that are designed to be mounted at the end of a boom of an excavator or similar prime mover.

BACKGROUND

This section provides background information related to the present disclosure which is not necessarily prior art.

The need for DC power on an attachment requires either electrical cabling or wiring down the boom, or power generation in the attachment. Many attachments have a surplus of hydraulic energy that could be converted to DC power. There are existing devices that do this, but they require high-quality, relatively low pressure hydraulic circuits or an additional case drain line.

One solution is to run electrical wiring down the boom from the high pressure hydraulic attachment. One challenge is to make sure such electrical wiring down the boom is present on every prime mover the high pressure hydraulic attachment is used on, and that it stays intact during operation. In addition, wiring down the boom is subject to damage from materials contact, from flexing at pivot joints, and from contacts at connection points and swivels.

Another solution is to use the high pressure hydraulic fluid to run a hydraulic motor that generates electricity at the boom. Using such high pressure hydraulic power, however, typically requires a case drain. This case drain would require another hydraulic line down the boom plumbed directly back to a tank. The inconvenience of this is essentially the same as adding wiring (making sure every machine has it, maintaining the line, etc.). Also, if the user does not have a case drain, they could damage the hydraulic motor. In addition, appropriately-sized hydraulic motors for such electrical power generation cannot typically handle the back pressure from the return line powering the high pressure hydraulic tool. This means an additional "low" pressure return line would be required to avoid problematic back pressure for such hydraulic motors. In addition, such hydraulic motors could not be installed in series on a full-pressure line.

SUMMARY

This section provides a general summary of the disclosure, and is not a comprehensive disclosure of its full scope or all of its features.

In accordance with one aspect of the present disclosure, an excavator boom mountable high-pressure hydraulic tool and having a full rated pressure is provided. The boom mountable hydraulic tool can include an electric power generation assembly. The electric power generation assembly can include a hydraulic motor having a motor output shaft and a sealed housing enclosing an entirety of the motor output shaft within an interior thereof. A motor non-contact coupling can be mounted on the motor output shaft within the sealed housing. The electric power generation assembly can also include an electric generator having a generator input shaft. A generator non-contact coupling can be coupled to the generator input shaft and positioned entirely outside the sealed housing. The motor non-contact coupling cab be drivingly coupled to the generator non-contact coupling. The boom mountable hydraulic tool can also include tool electrical components electrically coupled to the electric generator of the electric power generation assembly to receive power from the electric generator. The boom mountable hydraulic tool can also include a high pressure hydraulic tool circuit including a hydraulic tool load and the hydraulic motor of the electric power generation assembly coupleable between a hydraulic boom inlet line and a hydraulic boom return line. Both the hydraulic tool load and the hydraulic motor of the electric power generation assembly can be designed to input hydraulic fluid up to the full rated pressure of the tool. The sealed housing of the hydraulic motor of the electric power generation assembly can be designed to retain hydraulic fluid within the interior, up to the full rated pressure of the tool so that no case drain or separate low pressure return line for the hydraulic motor is necessary.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
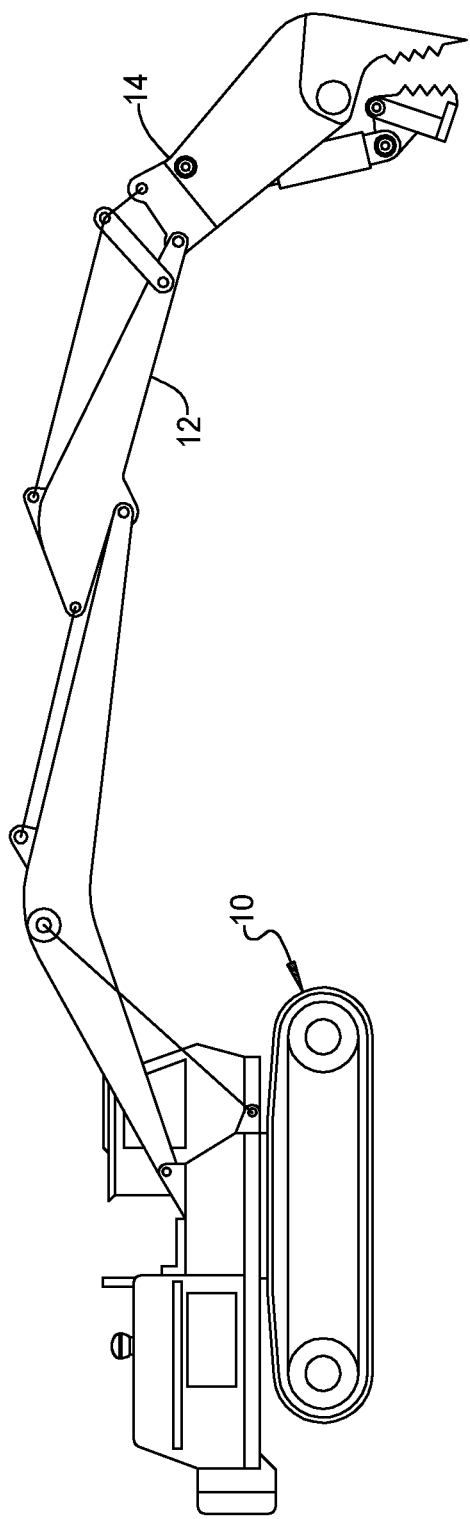
FIG. 1 is a side elevation view of an example excavator boom mountable high-pressure hydraulic tool mounted on a boom of a prime mover or excavator in accordance with the present disclosure.
Figure 2:
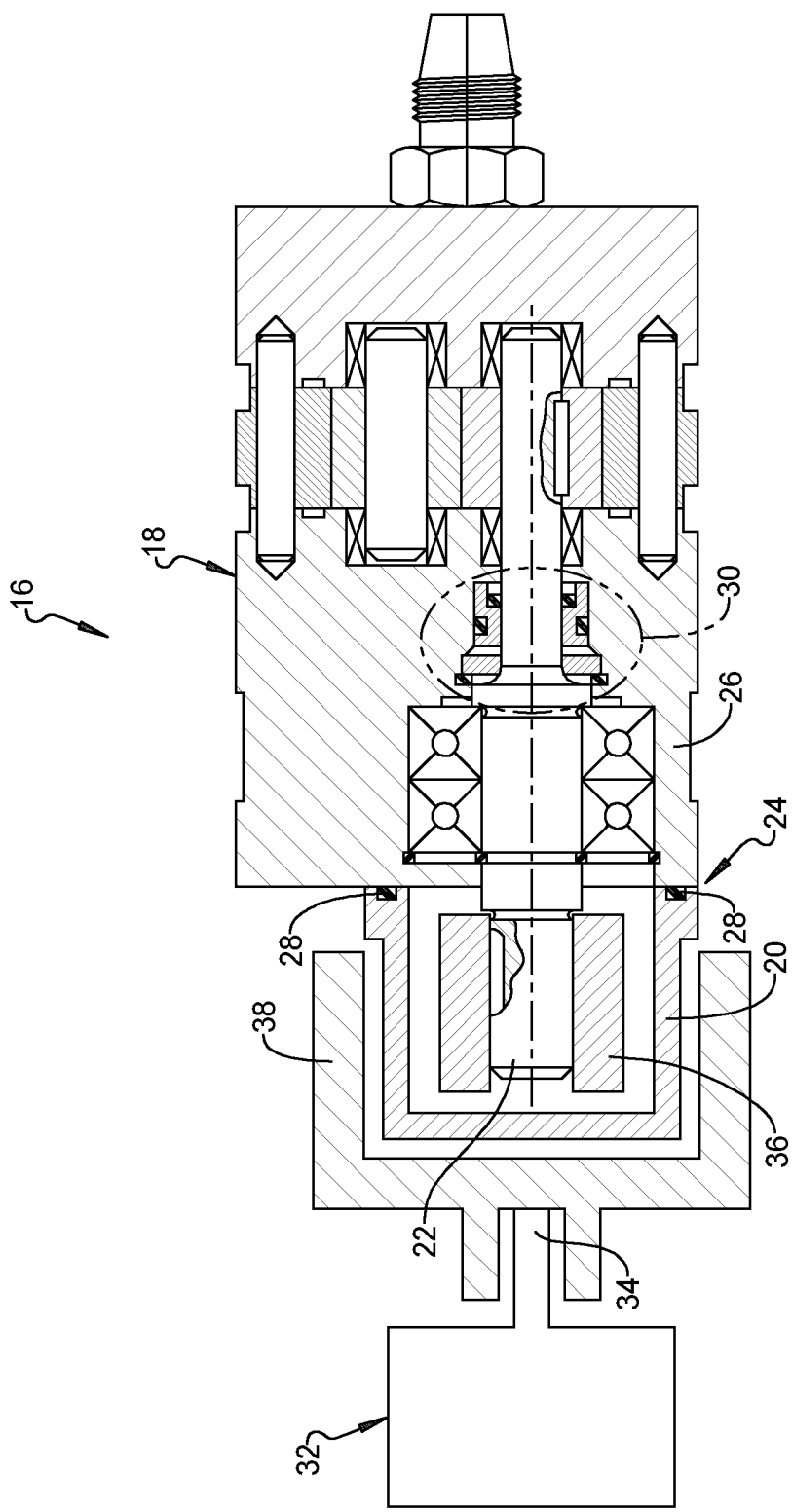
FIG. 2 is a cross sectional view of an example hydraulic motor and an electric generator of the electric power generation assembly of the excavator boom mountable high-pressure hydraulic tool of FIG. 1.

Example embodiments will now be described more fully with reference to the accompanying drawings.

Referring to FIGS. 1-5, a prime mover, such as the illustrated excavator 10, can have a high pressure hydraulic tool, such as the illustrated hydraulic shears or concrete processor 14, mounted at the end of the boom 12 of the excavator 10. Such high pressure hydraulic tools 14 can require hydraulic pressures that have a full rated pressure of at least 3,000 psi in some cases, and can have a full rated pressure of at least 4,000 psi in some cases, and can have a full rated pressure of at least 5,000 psi in some cases. In addition, the back pressure in the return line 42 from the tool 14 back to the excavator 10 can be significant. This back pressure in the return line can be at least 150 psi in some cases, and can be at least 500 psi in some cases, and can be at least 1000 psi in some cases, and can be at least 2000 psi in some cases.

The high pressure hydraulic tool 14 can have electrical components 58 for such activities as battery charging, powering and reading electronic sensors and related controller(s), providing communication, and activating solenoids. For example, electronic sensors can be provided for monitoring various parameters, such as temperature and pressure. The high pressure hydraulic tool 14 includes an electrical power generation assembly 16 to provide electrical power for the tool electrical components 58. The electrical power generation assembly 16 includes a hydraulic motor 18 that can be designed to contain the same high hydraulic pressure that is delivered to the high pressure hydraulic tool 14. The hydraulic motor 18 includes a hollow cylindrical housing portion 20 that receives and seals the output shaft 22 within the overall hydraulic motor housing assembly 24, including the housing portion 20.

The housing portion 20 can be a separate housing component that is sealed to main housing components 26 of the overall hydraulic motor housing assembly 24. For example, such a separate component housing portion 20 can be bolted around its periphery to the main housing components 26. An annular face seal 28 can be provided between the housing portion 20 and the main housing components 26 that is sufficient to seal the output shaft 22 within the housing assembly 24 against the full rated pressure of the high pressure hydraulic tool 14 when the housing portion 20 is bolted to the main housing components 26. In addition, the displacement or power of the hydraulic motor 18 can be selected so that it is optimized for that required for the generator 32 providing the desired AC or DC power generation.

Because the output shaft 22 of the hydraulic motor 18 is sealed within the sealed motor housing assembly 24, there is no need to provide a seal group 30 around the shaft 22. Thus, in this example embodiment, the seal group 30 illustrated in FIG. 2 would be eliminated. In addition, no sealing glands would be necessary. In any event, the entire interior of the housing assembly 24 can be allowed to flood with hydraulic fluid at the high pressures of the hydraulic tool 14. By sealing the output shaft 22 within the housing assembly 24 and allowing its interior to flood, there is no need for a case drain or an additional low pressure return line to avoid back pressure from the return line from the high pressure hydraulic tool 14.

The electric power generation assembly 16 additionally includes an electric generator 32. The output shaft 22 of the hydraulic motor 18 is operably coupled to the input shaft 34 of the generator 32 via a non-contact coupling. For example, such a non-contact coupling can include cooperating magnetic couplings 36, 38 provided on the motor output shaft 22 and generator input shaft 34, respectively. Thus, rotation of the motor output shaft 22 rotates the motor magnetic coupling 36, which magnetically engages or cooperates with the generator magnetic coupling 38 to correspondingly rotate the generator input shaft 32 and generate AC or DC electricity. As in the illustrated embodiment, the cooperating magnetic couplings 36, 38 can have a tubular or cup shape with a plurality of permanent magnets positioned cylindrically around the shape. For example, the magnets can be mounted directly to and around the output shaft 22 of the hydraulic motor 18 creating the tubular or cylindrical shape or positioning of the magnets.

In some cases, the cooperating magnetic couplings 36, 38 need not necessarily always rotate the shafts 22, 34, respectively, at the same speed. For example, if there is a heavy electrical load on the generator 32, or the hydraulic motor 18 abruptly changes speed, the cooperating cylindrical magnetic couplings 36, 38 can be allowed to rotate relative to each other at their rated torque value. As another example, the generator magnetic coupling 38 can be mounted on an input shaft of a gearbox with a gearbox output shaft that is physically coupled to the input shaft 34 of the generator 32, to better match a desired generator RPM. As another example, one or both of the cooperating magnetic couplings 36, 38 could be an electromagnet, allowing the cooperating couplings 36, 38 to be selectively turned on or off, disengaging from each other. As another example, the cooperating magnetic couplings 36, 38 could involve an eddy current magnet assembly, requiring relative motion between the cooperating magnet couplings 36, 38 in order to transmit torque. Other options are possible.

The excavator 10 provides hydraulic fluid to high pressure hydraulic tools 14 mounted on the end of the boom 12 via an excavator hydraulic circuit 44, including a pressure line 40 and a return line 42. The high pressure hydraulic tool 14 can be coupled into the excavator hydraulic circuit 44 between the pressure line 40 and the return line 42. Thus, the high pressure hydraulic tool 14 represents a hydraulic load 14 coupled to the excavator hydraulic circuit 44. This hydraulic load 14 can include one or more single-direction, or bi-directional motors 46, cylinders 48, or a combination of both.

Figure 3:
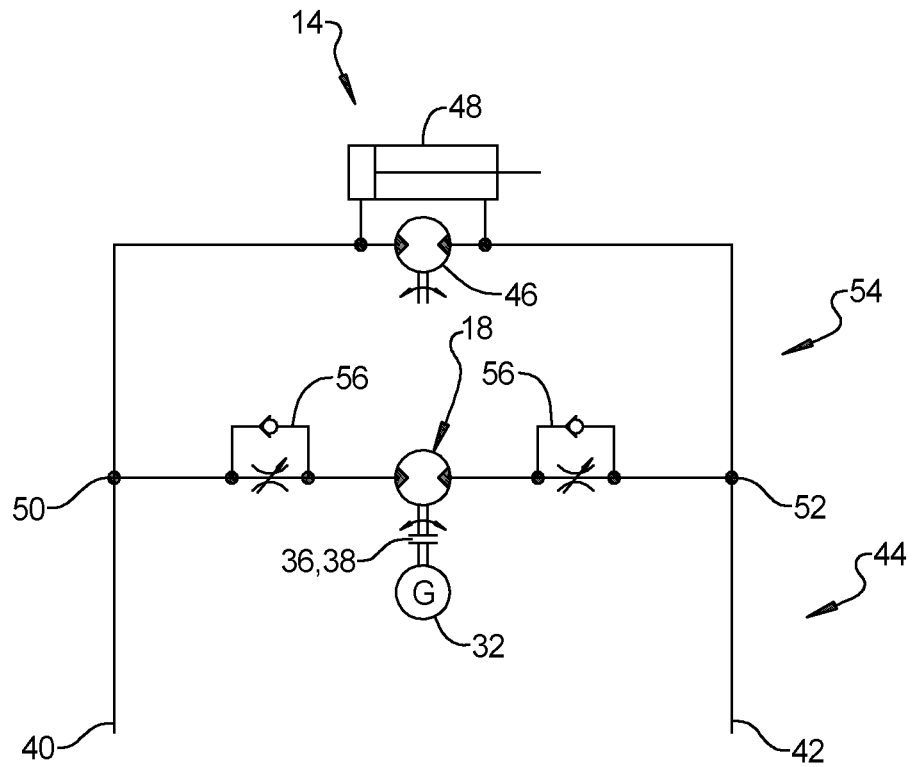
FIG. 3 is a hydraulic circuit diagram of an example tool hydraulic circuit of the example power generation assembly of the excavator boom mountable high-pressure hydraulic tool of FIG. 1.
Figure 4:
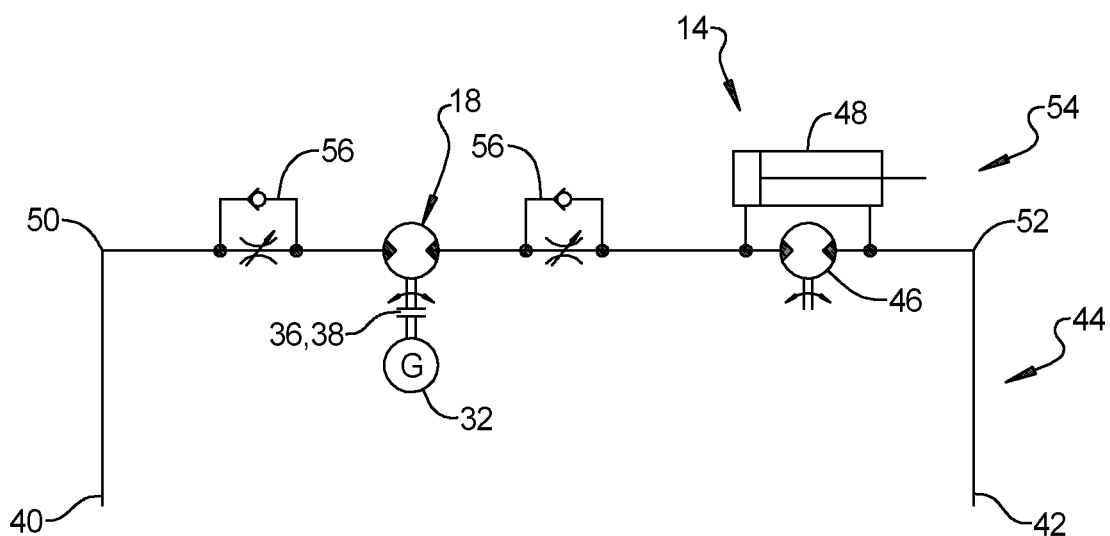
FIG. 4 is a hydraulic circuit diagram of another example tool hydraulic circuit for the example power generation assembly of the excavator boom mountable high-pressure hydraulic tool of FIG. 1.

The high pressure hydraulic tool 14 can include a tool hydraulic circuit 54 coupled to the pressure and return lines 40, 42 at couplings 50, 52, respectively. As illustrated in FIG. 3, the tool hydraulic circuit 54 can couple the electrical power generation assembly 16 in parallel with the motor 46 and/or cylinder 48 of the high pressure hydraulic tool 14. As illustrated in FIG. 4, the tool hydraulic circuit 54 can couple the electrical power generation assembly 16 in series with the motor 46 and/or cylinder 48 of the high pressure hydraulic tool 14.

Flow limiting valves 56 can be provided in the tool hydraulic circuit 54 to protect the hydraulic motor 18 and/or generator 32 from over speeding. Such flow limiting valves 56 may not be necessary in some cases. For example, the sealed hydraulic motor 18 of the electrical power generation assembly 16 can be sized sufficiently to handle full system flow in the series configuration (FIG. 4). Additionally or alternatively, a gearbox can be provided as noted above between the sealed housing assembly 24 of the hydraulic motor 18 and the generator 32 to protect the hydraulic motor 18 and/or generator 32 from over speeding.

In any event, a pressure differential between the pressure line 40 and the return lines 42 can be applied across the sealed hydraulic motor 18 to cause the motor output shaft 22 to rotate. This output shaft 22 is mechanically coupled to the motor magnetic coupling 36, which can rotate at the same speed with the motor output shaft 22. The motor magnetic coupling 36 within the sealed housing assembly 24 of the hydraulic motor 18 can be magnetically coupled to the generator magnetic coupling 38 for rotation at the same speed. The generator magnetic coupling 38 can be mechanically coupled through the sealed housing assembly 24 of the motor 18, directly or indirectly, to the shaft 34 of the generator 32 causing it to rotate in response. The rotation of the generator 32 can generate electrical power for various electrical components 58 of the high pressure hydraulic tool 14.

Figure 5:
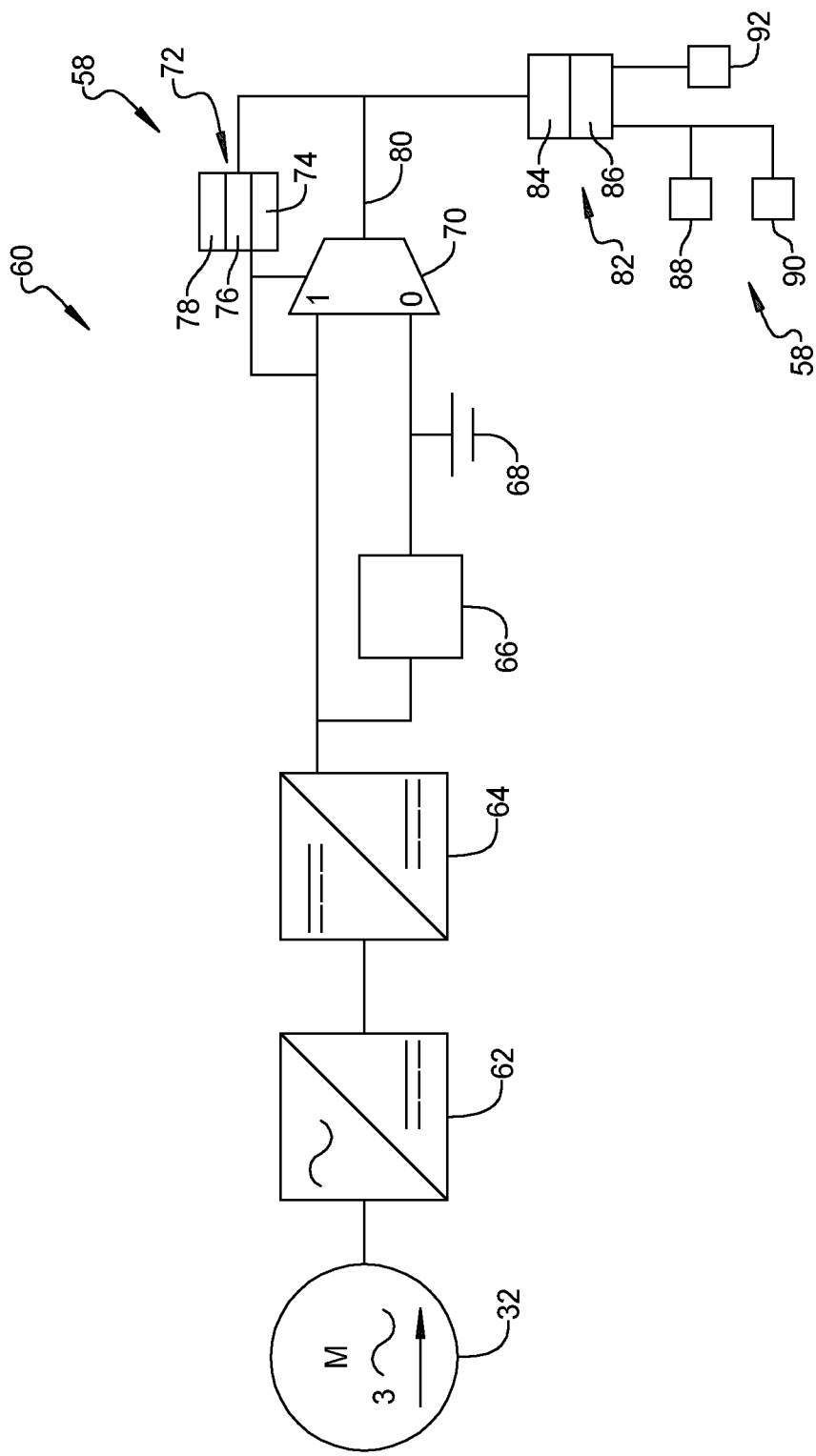
FIG. 5 is an electric circuit diagram of an example tool electric circuit of the example power generation assembly of the excavator boom mountable high-pressure hydraulic tool of FIG. 1.

Referring to FIG. 5, an electrical output of the generator 32 can be electrically coupled to an electric circuit 60. The electric circuit 60 can include a rectifier 62 to convert AC output of the generator 32 to DC power. A DC to DC regulator 64 can be provided to convert any variation in voltage outputted from the generator 32 into a steady desired voltage. For example, the desired voltage can be 14 volts. A battery charger 66 can be included to control power going to a battery 68 for charging. The battery 68 can store electrical energy to provide power to electrical components when the excavator hydraulic circuit 44 and tool hydraulic circuit 54 are not driving the hydraulic motor 18 and generator 32 to generate electric power.

A power source selector 70 can control whether the source of electric power being outputted to the tool electrical components 58 is provided from the generator 32 independent of the battery 68, or from the battery 66. A charging controller 72 can control the power source selector 70. Additionally or alternatively, the charging controller 72 can be used to illuminate an indicator light 74. The charging controller 72 can comprise control circuitry 76, such as a programmed integrated circuit, and memory 78. Any output charging controller 72 and indicator light 74 can be electrical components 58 that are powered via the output 80. The output 80 can also be electrically coupled to additional tool electrical components 58. Such electrical components 58 can include one or more additional controllers 82 that each can comprise control circuitry 84, such as a programmed integrated circuit, and memory 86. Such controllers 82 can be coupled to, for example, electronic sensors 88, or solenoids 90, or both, which can be powered via the output 80.

Such controllers 82 can additionally provide communication with tool electrical components 58, with a separate main tool controller (not shown), with the excavator 10, or with any combination thereof. For example, the communication can be provided via wires (not shown) or via a wireless transceiver 92. Alternatively, a single controller can comprise both the charging controller 72 and one or more of the additional controllers 82. Additionally or alternatively, a single main tool controller can additionally comprise the charging controller 72, or one or more of the additional controllers 82, or any combination thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

When an element is referred to as being "connected to," or "coupled to" another element, mechanically or electrically, it may be directly connected or coupled to the other element, or intervening elements may be present. This is true even though the drawings of the example embodiments illustrate, and provide support for, such elements being "directly connected to," or "directly coupled to," another element or layer in which no intervening elements are present. Other words used to describe the relationship between elements should be interpreted in a like fashion (e.g., "between" versus "directly between," "adjacent" versus "directly adjacent," etc.).

What is claimed is:

1. An excavator boom mountable high-pressure hydraulic tool and having a full rated pressure, the tool comprising:
   an electric power generation assembly including:
      a hydraulic motor having a motor output shaft, a sealed housing enclosing an entirety of the motor output shaft within an interior thereof, and a motor non-contact coupling mounted on the motor output shaft within the sealed housing;
      an electric generator having a generator input shaft and a generator non-contact coupling coupled to the generator input shaft and positioned entirely outside the sealed housing, the motor non-contact coupling being drivingly coupled to the generator non-contact coupling; and
   tool electrical components electrically coupled to the electric generator of the electric power generation assembly to receive power from the electric generator;
   a high pressure hydraulic tool circuit including a hydraulic tool load and the hydraulic motor of the electric power generation assembly coupleable between a hydraulic boom inlet line and a hydraulic boom return line;
   wherein both the hydraulic tool load and the hydraulic motor of the electric power generation assembly are designed to input hydraulic fluid up to the full rated pressure of the tool; and
   wherein the sealed housing of the hydraulic motor of the electric power generation assembly is designed to retain hydraulic fluid within the interior up to the full rated pressure of the tool so that no case drain or separate low pressure return line is necessary.

2. The excavator boom mountable high-pressure hydraulic tool of claim 1, wherein the hydraulic motor of the electric power generation assembly is designed to input hydraulic fluid from the boom input line up to the full rated pressure of at least 3,000 psi.

3. The excavator boom mountable high-pressure hydraulic tool of claim 1, wherein the hydraulic motor of the electric power generation assembly is designed to output hydraulic fluid to the hydraulic boom return line at a pressure of at least 500 psi.

4. The excavator boom mountable high-pressure hydraulic tool of claim 1, wherein the sealed housing includes a cylindrical housing portion that receives and encloses the motor output shaft within an overall motor housing assembly.

5. The excavator boom mountable high-pressure hydraulic tool of claim 1, wherein the sealed housing includes a cylindrical housing portion sealed to an additional housing portion, and wherein the cylindrical housing portion receives and encloses the motor output shaft.

6. The excavator boom mountable high-pressure hydraulic tool of claim 1, wherein the hydraulic motor is designed to output a power that is optimized to the needs of the electric generator in providing AC or DC electric power generation for the tool electric components.

7. The excavator boom mountable high-pressure hydraulic tool of claim 1, wherein the motor and generator non-contact couplings are magnetic non-contact couplings.

8. The excavator boom mountable high-pressure hydraulic tool of claim 1, wherein the generator non-contact coupling is mounted on the generator input shaft.

9. The excavator boom mountable high-pressure hydraulic tool of claim 1, wherein the hydraulic tool load and the hydraulic motor of the electric power generation assembly are coupled in series in the high pressure hydraulic circuit.

10. The excavator boom mountable high-pressure hydraulic tool of claim 1, wherein the hydraulic tool load and the hydraulic motor of the electric power generation assembly are coupled in parallel in the high pressure hydraulic circuit.

11. The excavator boom mountable high-pressure hydraulic tool of claim 1, wherein flow limiting valves can be provided in the high pressure hydraulic circuit adjacent the hydraulic motor of the electric power generation assembly.

12. The excavator boom mountable high-pressure hydraulic tool of claim 1, wherein the tool electrical components include electronic pressure sensors to monitor pressure at various points in the high pressure hydraulic tool circuit.

13. The excavator boom mountable high-pressure hydraulic tool of claim 1, wherein the tool electrical components include a rectifier to convert an AC output of the electric generator of the electric power generation assembly to DC power.

14. The excavator boom mountable high-pressure hydraulic tool of claim 1, wherein the tool electrical components include a DC to DC regulator to convert an output voltage to provide a steady desired voltage from the electric generator of the electric power generation assembly.

15. The excavator boom mountable high-pressure hydraulic tool of claim 1, wherein the tool electrical components include a battery charger electrically coupled to a battery.

16. The excavator boom mountable high-pressure hydraulic tool of claim 15, wherein the tool electrical components are electrically coupled to the electric generator to receive power from the electric generator via the battery.

17. The excavator boom mountable high-pressure hydraulic tool of claim 15, wherein the tool electrical components are electrically coupled to the electric generator to selectively receive power from the electric generator via the battery or directly from the electric generator.

18. The excavator boom mountable high-pressure hydraulic tool of claim 17, wherein the tool electrical components include a controller comprising control circuitry coupled to a power source selector to selectively provide other tool electric components with power directly from the electric generator or indirectly from the electric generator via a battery.

19. The excavator boom mountable high-pressure hydraulic tool of claim 1, wherein the tool electrical components include a controller comprising control circuitry.

20. The excavator boom mountable high-pressure hydraulic tool of claim 19, wherein the control circuitry is coupled to an electronic pressure sensor.

21. The excavator boom mountable high-pressure hydraulic tool of claim 19, wherein the control circuitry is coupled to a solenoid.

22. The excavator boom mountable high-pressure hydraulic tool of claim 19, wherein the control circuitry is coupled to a wireless transceiver.

23. The excavator boom mountable high-pressure hydraulic tool of claim 1, wherein the control circuitry includes battery charger control circuitry.

* * * * *